United States Patent [19]

Russotti

[11] 4,340,293
[45] Jul. 20, 1982

[54] FOLDABLE SUPPORT FOR CONTINUOUS BACKGROUND FOR USE IN PHOTOGRAPHING OBJECTS

[76] Inventor: Enzo Russotti, Via Giovanni Cantoni, 6, 20100 Milano, Italy

[21] Appl. No.: 275,011

[22] Filed: Apr. 16, 1981

[30] Foreign Application Priority Data

May 8, 1980 [IT] Italy ................................ 21894 A/80

[51] Int. Cl.³ ............................................ G03B 15/00
[52] U.S. Cl. ..................................................... 354/291
[58] Field of Search .............................. 354/290–292, 354/80; 160/377; 108/23

[56] References Cited

U.S. PATENT DOCUMENTS

| | | |
|---|---|---|
| 596,312 | 12/1897 | Badgley . |
| 641,947 | 1/1900 | Farrand . |
| 2,996,954 | 8/1961 | Schroder . |
| 3,128,688 | 4/1964 | Coda .................................. 354/291 |
| 3,587,183 | 6/1971 | Davis . |

FOREIGN PATENT DOCUMENTS

| | | |
|---|---|---|
| 2550377 | 12/1977 | Fed. Rep. of Germany . |
| 389930 | 5/1908 | France ................................ 354/291 |
| 997831 | 6/1923 | Switzerland . |
| 160539 | 3/1921 | United Kingdom ................ 354/291 |
| 1336554 | 7/1973 | United Kingdom . |

*Primary Examiner*—John Gonzales
*Attorney, Agent, or Firm*—Young & Thompson

[57] ABSTRACT

Foldable support for a translucent continuous sheet apt to be used as a background in photographing objects, comprising a main substantially vertical rigid frame mounted on a base, preferably provided with wheels, two superimposed movable frames, both rotating about horizontal parallel axes, formed of pairs of hinges provided on the vertical sides of said rigid frame; two vertical uprights hinged to the rear ends of said movable frames, so as to form two articulated parallelograms, a continuous sheet of translucent material being secured between the front edge of the lower movable frame and the rear end of the upper movable frame. This support may be provided with a cover and a roll of colored material to vary the type of background.

6 Claims, 3 Drawing Figures

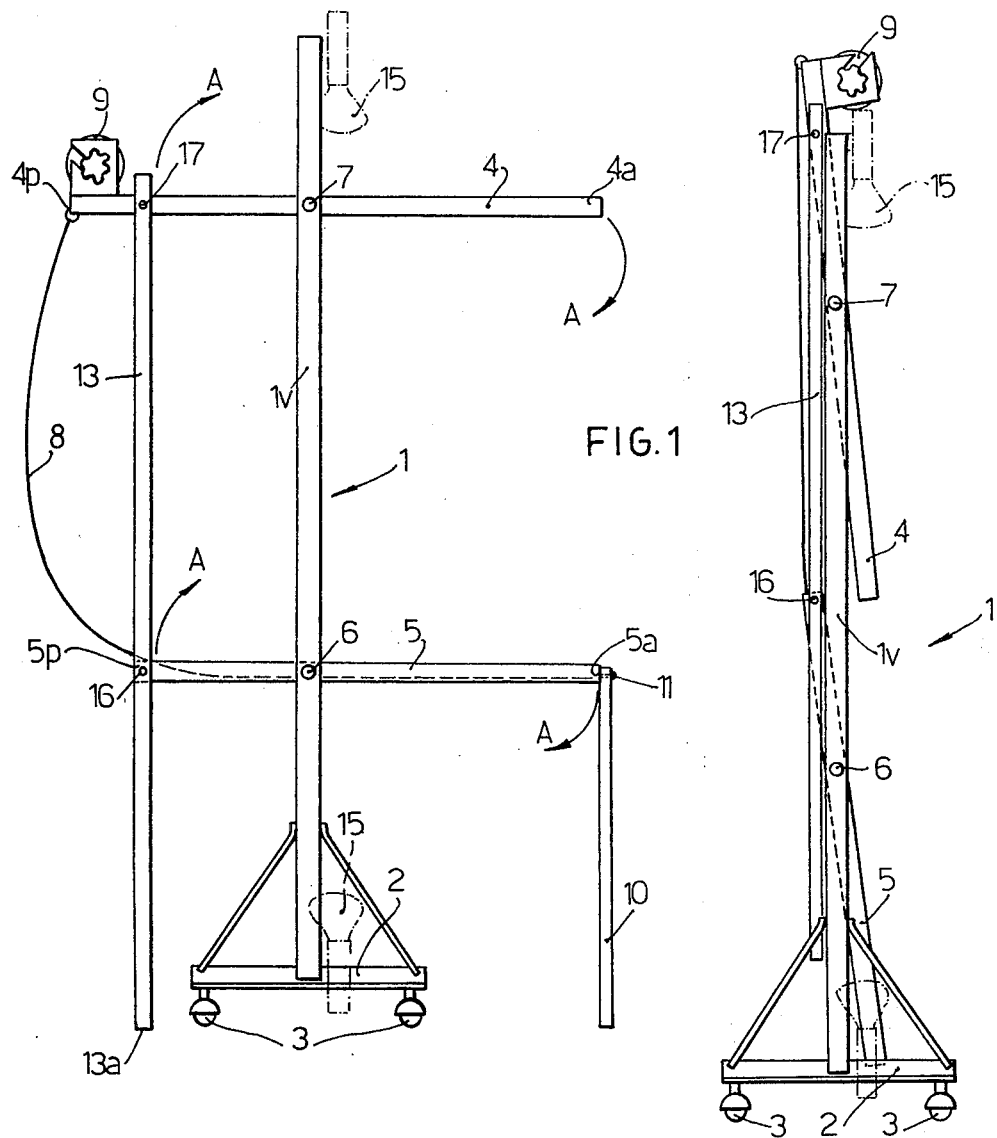

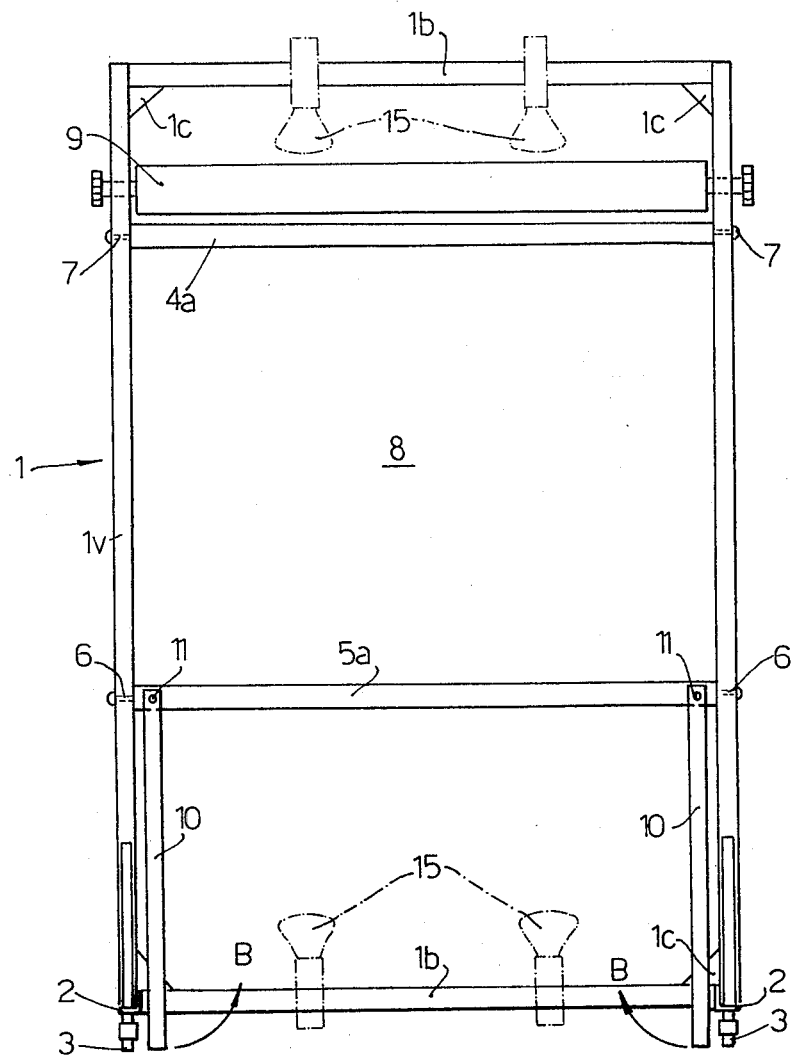

FOLDABLE SUPPORT FOR CONTINUOUS BACKGROUND FOR USE IN PHOTOGRAPHING OBJECTS

This invention relates to a support building a continuous background suitable to be used, for example, for taking shadowless photographies, or anyhow providing a continuous background for any object to be photographed.

Hitherto, this was accomplished by using a continuous background, the support of which comprises rigid uprights and crosspieces. This cumbersome frame carries a translucid sheet of frosted glass, or plexiglas, on the lower part of which the object to be photographed is placed.

The main disadvantages of this type of device are its considerable overall size, that is the time consuming required for its assembling and relative disassembling whenever desiring to store it after use.

It is the object of the device according to the present application to eliminate the above mentioned disadvantages, that is to provide a background support which may collapse after use, so as to reach a thickness of only a few centimeters.

The above object has been accomplished by main rigid rectangular frame vertically mounted on a base; by two movable frames superimposed to each other and both rotating about horizontal parallel axes formed of pairs of hinges provided on the vertical sides of the rigid frame; by two vertical uprights, located behind the fixed frame and hinged to the ends of said movable frames, so that the assembly comprising the rigid frame, the two movable frames and the uprights forms a parallelogram which by flattening out may collapse, the lower ends of the uprights being allowed to directly rest on the floor when the parallelogram is at open position, and a sheet of translucent material being placed between the front edge of the lower movable frame and the rear edge of the upper movable frame.

A preferred solution of the present invention contemplates that the rigid frame is provided with wheels.

Another preferred solution of the invention contemplates that the front edge of the lower movable frame is provided with bearing feet hingedly mounted on said frame, so that even heavy objects can bear on said lower movable frame.

A futher improvement provides that a roll of coloured material (such as paper) is mounted adjacent the rear edge of the movable frame, so as the background can also be used for coloured backgrounds.

A suitable type of lighting system can be arranged on the upper and lower sides of the main rigid frame.

A further improvement of the invention consists in extending the upper movable frame, so that the latter substantially covers the lower movable frame, by applying thereon a diffuser, such as of nylon cloth, which can be removed when not in use.

The device according to the present invention will now be hereinafter described by way of unrestrictive example with reference to the accompanying drawings, in which:

FIG. 1 is a side view of a support according to the present invention at open position, that is when being used;

FIG. 2 is a front view of the support shown in FIG. 1 at open condition, that is ready for use; and FIG. 3 is a side view of the support at closed position, ready for storage.

A device for supporting a translucent continuous sheet, for example of Plexiglas, for providing a background for the photographic technique has been shown in the accompanying drawings. It comprises a main rigid rectangular frame 1, formed of two vertical sides 1v and two horizontal sides 1b joined together by means of connection plates 1c, the assembly being mounted on a base 2 provided with wheels 3. Two movable superimposed frames 4 and 5 are hinged at 6 and 7 to the vertical sides 1v of the rigid frame 1. Said movable frames 4 and 5 are further hinged adjacent the rear ends thereof 4p and 5p, namely at 16 and 17, to two uprights 13 arranged behind said fixed frame 1. Said uprights 13 directly rest on the floor on the lower ends 13a thereof, the rear end 4p of the movable frame 4 carries a Plexiglas sheet 8 anchored thereon by rotatable rings so that such a sheet can bend, as shown in FIG. 1.

The Plexiglass sheet 8 is tensioned and anchored, at the front edge 5a of frame 5 and also laterally at said frame 5, so that the sheet will not bend even when photographing a heavy object which will be placed on the horizontal portion of said translucent sheet 8.

A known type of lighting system, generally denoted at 15, is movably arranged on the upper and lower sides of the rigid frame 1.

Two bearing feet 10 hinged at 11 may be mounted on the front edge 5a of the lower movable frame 5, so as to collapse in the direction of arrows B. A rolling up device 9, carrying roll of coloured backgrounds, is secured at the rear end 4p of the upper movable frame 4.

From the foregoing, it will be seen that the movable frames 4 and 5 can both rotate in the direction of arrows A and move to the not in use reduced size position which has been shown in FIG. 3. Of course, where two bearing feet 10 are provided, the latter will be bent before hand in the direction of arrows B.

The present invention embraces all the detail variants which may be obvious to those skilled in the art.

What I claim is:

1. A foldable support for a continuous background for use in photographing objects, characterized by comprising a main substantially vertical rigid frame mounted on a base; two superimposed movable frames, both rotating about parallel horizontal axes formed of pairs of hinges provided on the vertical sides of said rigid frame, so as to make up two articulated parallelograms, a continuous sheet being secured between the front edge of the lower movable frame and the rear edge of the upper movable frame.

2. A support according to claim 1, characterized in that said rigid frame is provided with a base fitted with wheels.

3. A support according to claim 1, characterized in that said upper movable frame extends over said lower movable frame, so as to provide a cover, on which a diffuser, such as a nylon cloth, may be provided.

4. A support according to claim 1, characterized in that a rolling up device is provided for a roll of coloured material arranged near the rear end of the upper movable frame.

5. A support according to claim 1, characterized in that the front edge of the lower movable frame is provided with bearing feet hinged to said front edge.

6. A support according to claim 1, characterized in that one or more lighting units are provided thereon as arranged at the upper and lower ends of said rigid frame.

* * * * *